(12) United States Patent
Kleine et al.

(10) Patent No.: US 7,515,389 B2
(45) Date of Patent: Apr. 7, 2009

(54) METHOD AND DEVICE FOR SAFELY DISCONNECTING ELECTRIC DRIVES

(75) Inventors: Ronald Kleine, Wetter (DE); Andreas Kruschinski, Düsseldorf (DE); Frank Demelius, Schmallenberg (DE)

(73) Assignee: Gottwald Port Technology GmbH, Duesseldorf (DE)

( * ) Notice: Subject to any disclaimer, the term of this patent is extended or adjusted under 35 U.S.C. 154(b) by 43 days.

(21) Appl. No.: 10/545,860

(22) PCT Filed: Feb. 26, 2004

(86) PCT No.: PCT/EP2004/001914

§ 371 (c)(1),
(2), (4) Date: Mar. 30, 2006

(87) PCT Pub. No.: WO2004/077177

PCT Pub. Date: Sep. 10, 2004

(65) Prior Publication Data

US 2006/0238934 A1    Oct. 26, 2006

(30) Foreign Application Priority Data

Feb. 28, 2003  (DE) ............................ 103 09 218
Feb. 28, 2003  (DE) ............................ 103 09 219

(51) Int. Cl.
*H02H 3/00* (2006.01)
*H02H 3/05* (2006.01)

(52) U.S. Cl. ...................... 361/51; 361/53; 361/189; 212/281

(58) Field of Classification Search ............... 361/51, 361/52, 189, 53; 212/281
See application file for complete search history.

(56) References Cited

U.S. PATENT DOCUMENTS 4,177,973 A * 12/1979 Miller et al. ............... 254/276

(Continued)

FOREIGN PATENT DOCUMENTS

DE          44 40 420 C2    3/1997

(Continued)

OTHER PUBLICATIONS

The Authoritative Dictionary of IEEE Standards Terms, 2000, IEEE Press, 7th Edition, p. 940.*

(Continued)

*Primary Examiner*—Stephen W Jackson
*Assistant Examiner*—Zeev Kitov
(74) *Attorney, Agent, or Firm*—Van Dyke, Gardner, Linn & Burkhart, LLP

(57) ABSTRACT

The invention relates to a method and a device for safely disconnecting electric drives, wherein disturbances of the electric drive which are independent from the driving and lifting speed are recognized in a delay-free manner by retaining the safety function and are used for disconnecting the electric drive. The signals of the sensors (7.1, 7.2, 8.1, 8.2) are detected in a redundant manner and are redundantly compared to preselected threshold values in evaluation devices (2.1, 2.2) such that the electric drive (12) is safely disconnected in a redundant manner without using mechanical position devices if the preselected threshold value of the electric drive (12) is exceeded.

25 Claims, 2 Drawing Sheets

U.S. PATENT DOCUMENTS

| | | | | |
|---|---|---|---|---|
| 4,501,343 | A | * | 2/1985 | Salihi .......................... 187/296 |
| 5,481,248 | A | * | 1/1996 | Kruh .......................... 340/685 |
| 5,729,453 | A | * | 3/1998 | Lee et al. ...................... 701/50 |
| 5,818,185 | A | * | 10/1998 | Freitag et al. ................ 318/432 |
| 6,837,045 | B2 | * | 1/2005 | Heusser ....................... 60/403 |

FOREIGN PATENT DOCUMENTS

| | | |
|---|---|---|
| DE | 196 12 423 A1 | 10/1997 |
| DE | 199 05 019 C2 | 3/2001 |
| EP | 0 382 231 A1 | 8/1980 |
| EP | 0 347 408 | 6/1989 |
| EP | 0 476 459 A2 | 3/1992 |
| EP | 0 504 867 A1 | 9/1992 |
| JP | 12166291 A | 6/2000 |

OTHER PUBLICATIONS

International Search Report (Form PCT/ISA/210) from corresponding Patent Cooperation Treaty Application No. PCT/EP2004/001914, dated Jun. 8, 2004.

* cited by examiner

METHOD AND DEVICE FOR SAFELY DISCONNECTING ELECTRIC DRIVES

BACKGROUND OF THE INVENTION

The invention concerns a method and a device for safe disconnection of electric drives configured as frequency-controlled three-phase crane motors, in which signals from at least one sensor, which detects the motions produced by the electric drive, are compared in an evaluation unit with a preselected limit value and a safe disconnection is achieved via the evaluation unit to produce the function of an end switch element in the event that the preselected limit value of the electric drive is exceeded.

In lifting mechanisms of hoisting equipment, a highly reliable insurance against dropping of the load in the event of mechanical flaws in the lifting mechanism is required. For this reason, the legislature as well has mandated extensive safety measures, such as those set forth, for example, in the European license EN954.T1 for lifting mechanisms. In order to achieve the high safety standard of EN954.T1, Category 3, cranes at present employ path limiters, such as transmission limit switches, incremental pickups for speed governing of the drive, as well as centrifugal switches to detect overspeeding of the drum of the lifting mechanism. At a given overspeeding, the centrifugal switch shuts off the lifting mechanism and activates its brake.

The drawback to this layout is that the lifting mechanism can only be shut off at a relatively high maximum number of revolutions, because different velocities, which are even higher than this, can occur during operation with a load. But when the lifting mechanism is working with various velocities, depending on the load, the centrifugal switch recognizes the overspeeding only when the maximum setpoint velocity is attained. As a result, it can happen that the disconnection by overspeeding is delayed for a needlessly long time when operating at maximum load and moving in dependence on the load, that is, when traveling with low velocity and heavy weight, with the danger that a heavy load with unwanted acceleration can only be halted with great difficulty at times.

Other end switches traditionally used for the safe disconnection of a crane's lifting mechanism are so-called transmission limit switches, which detect the number of revolutions of the drum of the lifting mechanism and provide for an end shut-off when only the required minimum number of turns is left on the cable drum as the cable is being paid out.

Furthermore, in the state of the art at present, electromechanical end switches are arranged on the axle of a crane to limit the path of crane trolleys or gantry cranes, for example. These end switches often have several trip cams and they are activated by a mechanical driver at a particular position in the path of the crane trolley or the gantry crane as this position is neared.

However, this technique has its disadvantages. If several end switches are present on a crane axle, for example, if several speed levels have to be monitored or switched off for said crane axle, this can result in malfunctioning if the driver fails or gets misadjusted. Likewise, the switch can become "overridden" when the axle is traveling at high velocity, such as is possible in the case of cross roller switches. The stationary mounted cross roller switch is activated by a movable driver. The switch then executes a rotary motion. If, now, the driver is moved quickly across the cross roller switch, the latter may become stripped or be overridden. The expected clear switching signal is then not recognized, and possibly several signal conditions one after the other will be reported. Additional drawbacks are the large adjustment time needed for this end switch with its drivers in terms of position and the switching hysteresis.

The high cost of materials and wiring are additional drawbacks when one uses a contactor-based logical control and storage-programmable control systems, since for safety considerations the contacts of the end switch very often need to be hooked up in parallel, in order to ensure a "hard-wired" disconnection.

From German patent DE 44 40 420 C2, a mechanism is known for monitoring and/or controlling the number of revolutions of an electric drive. The electric drive consists of an induction motor, hooked up to an alternating or three-phase current network and outfitted with a brake device. A revolution counter is connected to the induction motor and its pulses are taken to a speed control mechanism. The speed control mechanism acts on the induction motor via a frequency converter and it controls or monitors the induction motor such that the maximum number of revolutions is limited for different loads, so that a dangerous movement of the load due to exceeding of the available braking moment is prevented and loads once lifted are held securely. Normally, for safety reasons, an electromechanical centrifugal switch is also present, being triggered at a preset maximum number of revolutions.

Furthermore, from German application DE 196 12 423 A1, there is known a safety and control system for crane equipment with at least one control system and corresponding safety circuits. By definition, the control systems are, in particular, interlocks, which serve for comfort and also possibly support the safety circuits. By safety circuits are meant those interlocks which serve the parking safety of a crane and the protection of the persons. When necessary, the safety circuits bring about a coerced disconnection of the power supply to the particular drive of the crane equipment. If the coercive signal of an end switch is processed in an electronic control system, an error will be accordingly detected there and then be reported or used to disconnect the drive. In order to satisfy existing safety standards, it is proposed to provide two redundant storage-programmable control systems in addition to the actual control system for the safety circuits, being connected via a redundant bus system to likewise redundant sensors. The sensors serve to detect path, load, or speed signals. This safety and control system thus works with a redundant electronic detection and a redundant electronic evaluation of the signals from the sensors. Any resulting disconnection of the drive or activation of a brake will not be redundant, but rather occur via one of the two storage-programmable control systems.

SUMMARY OF THE INVENTION

The problem solved by the present invention is to create a method and a device for the safe disconnection of electric drives, especially of frequency-controlled three-phase crane motors, wherein faults of the electric drive are recognized without delay, regardless of the speed of travel or speed of lifting, and used to switch off the electric drive, while maintaining the safety function.

This problem is solved by a method for the safe disconnection of electric drives, especially of frequency-controlled three-phase crane motors, with the features of claim 1, and also by a device for the safe disconnection of corresponding electric drives, with the features of claim 3. Advantageous embodiments of the method and the device are indicated in the subsidiary claims 2 and 4 to 20.

In the method for the safe disconnection of electric drives, especially of frequency-controlled three-phase crane motors, in which signals from at least one sensor, which detects the movements produced by the electric drive, are compared in an evaluation unit to a preselected limit value and the evaluation unit is used to provide the function of an end switch element and bring about a safe disconnection in the event of exceeding of the preselected limit value of the electric drive, faults of the electric drive are recognized without delay, regardless of the speed of travel or speed of lifting, and used to switch off the electric drive, while maintaining the safety function, in that the signals of the sensors are redundantly detected and redundantly compared in evaluation units to preselected limit values, so that a redundant safe disconnection of the electric drive is achieved without the use of mechanical end switches in event of an exceeding of the preselected limit value.

In this proposed safe method, according to the invention, the controlling of the electric drive occurs without mechanical end switches, simply by redundant signal monitoring. Thus, malfunctions in mechanical end switch apparatus and the corresponding components, as were described at the outset for the prior art, are reliably prevented. There is no time-consuming adjustment of end switches.

In the context of the present invention, by end switch elements is meant mechanical end switches such as transmission limit switches, mechanical centrifugal switches and mechanical path limiting switches. Furthermore, the present invention can be used with any type of controlled or governed electric drive, operated with DC, AC, or three-phase current.

A further optimization of the safety is achieved in that the signals of the redundant sensors are taken to corresponding redundant evaluation units, where they are evaluated, and if the respective signals of the sensors deviate from each other, the electric drive is safely disconnected by safe disconnection elements.

The fact that the redundant evaluation units mutually monitor each other and the electric drive is safely disconnected by safe disconnection elements if their disconnect signals deviate from each other also contributes to an improved safety.

The particular benefit of the invention consists in that the two parts of the evaluation unit work on the principle of mutual checking of their own resulting logical decision. The logically positive condition, i.e., the enabling of the electric drive, is only maintained with mutual consent of the evaluation units. On the other hand, the termination of the logically positive condition takes place by itself alone, i.e., without mutual consent of the evaluation units. Each individual part of the evaluation unit can thus compel a termination by itself. Finally, both evaluation units check their "live" status and, in this way, their lines of communication.

In one embodiment, redundant sensors detect the revolutions of a body moved by the electric drive, especially a cable drum and/or a running wheel, and additional redundant sensors detect the position of the body moved by the electric drive, in particular a cable drum and/or a running wheel.

In a device for the safe disconnection of electric drives, with at least one sensor, which detects the movements produced by the electric drive, with an evaluation unit processing the signals of the sensor for comparing the signals of the sensor to a preselected limit value and for safe disconnecting of the electric drive to provide the function of an end switch element in the event of exceeding of the preselected limit value, while maintaining the safety function, faults of the electric drive are recognized without delay, regardless of the speed of travel or speed of lifting, and used to switch off the electric drive, in that the sensors and the evaluation unit are redundantly provided and each of the redundant sensors is coordinated with one of the evaluation units, the signal of the sensors are [sic!] compared in the evaluation units to the preselected limit values, and a redundant safe disconnection of the electric drive is achieved by them without the use of mechanical end switches in event of an exceeding of the preselected limit value.

A further safety improvement may be achieved by the redundant evaluation units being connected to each other via a communication line for mutual monitoring, in the respective redundant evaluation units the signals of the respective redundant sensors being compared and, in event of a deviation of the respective signals of the sensors from each other, the evaluation units safely disconnect the electric drive by safety disconnect elements. Safety is also served in that the redundant evaluation units are connected to each other by a communication line for mutual monitoring and when their disconnect signals differ from each other they safely disconnect the electric drive by safety disconnect elements.

In one embodiment, first redundant sensors for detection of the revolutions of a body moved by the electric drive, especially a cable drum and/or a running wheel, are assigned to the body and second redundant sensors for detection of the position of the body moved by the electric drive, especially a cable drum and/or a running wheel, are assigned to the body. In this way, the required category 3 per the European safety EN954.T1 is fulfilled with simple means of a safe disconnection and this without the use of a mechanical centrifugal switch, which is acknowledged as being a drawback, but instead solely thanks to a redundant speed monitoring.

Another embodiment calls for at least two absolute value transmitters being assigned to the electric drive at its power take-off side for a redundant position detection.

Because the evaluation units constantly update the absolute position values of a travel way or the winding/unwinding path of a cable and the values permanently stored in the evaluation units are constantly compared to the actual values of a travel way or winding/unwinding path of a cable, according to another feature of the invention, as the position values furnished instantaneously by the absolute value transmitter approach the position value defining the end of the travel way or winding/unwinding path of a cable, the evaluation units decrease the switching points on their disconnect curves in proportion to this proximity. This makes possible a highly sensitive and precise disconnection of the axle's movement.

One pulse transmitter may be assigned to the body at the drive side and at least one pulse transmitter at the power take-off side, the pulse transmitter at the drive side and the pulse transmitter at the power take-off side are each connected to an evaluation unit, in each of the evaluation units the revolutions of the axle of the body are redundantly calculated in an ongoing manner in terms of the increments of the pulse transmitters at the drive side and the power take-off side and compared to an overspeeding value stored in the evaluation unit for safe disconnection of the lifting mechanism of the electric drive.

In one embodiment of the invention, the body is a cable drum and the overspeeding values are stored in the evaluation units as a function of the load being lifted.

An especially simple mutual checking of the evaluation units is achieved in that the evaluation units are designed to be redundant in function and in hardware.

Advantageously, the evaluation units can be assembled in a single failsafe evaluation unit.

Moreover, the redundancy which is used throughout is accomplished in that the sensors are each connected to a transmitter unit, each of the transmitter units are connected by their own transmission path to a receiving unit, which in turn are connected to the corresponding evaluation unit.

In a further embodiment of the invention, the two evaluation units constantly update the absolute position values of the two absolute value transmitters and the current position feedback values are compared to position setpoint values of the travel way that are permanently stored in the evaluation units. The failure of one absolute value transmitter is recognized and reported and the electric safety circuit is disconnected, if necessary.

A safety circuit according to the invention shall be described in various embodiments by means of the following drawings. These show:

BRIEF DESCRIPTION OF THE DRAWINGS

FIG. 3, a safety circuit per FIG. 2 in an alternative embodiment.

DETAILED DESCRIPTION OF THE PREFERRED EMBODIMENT

Figure 1:
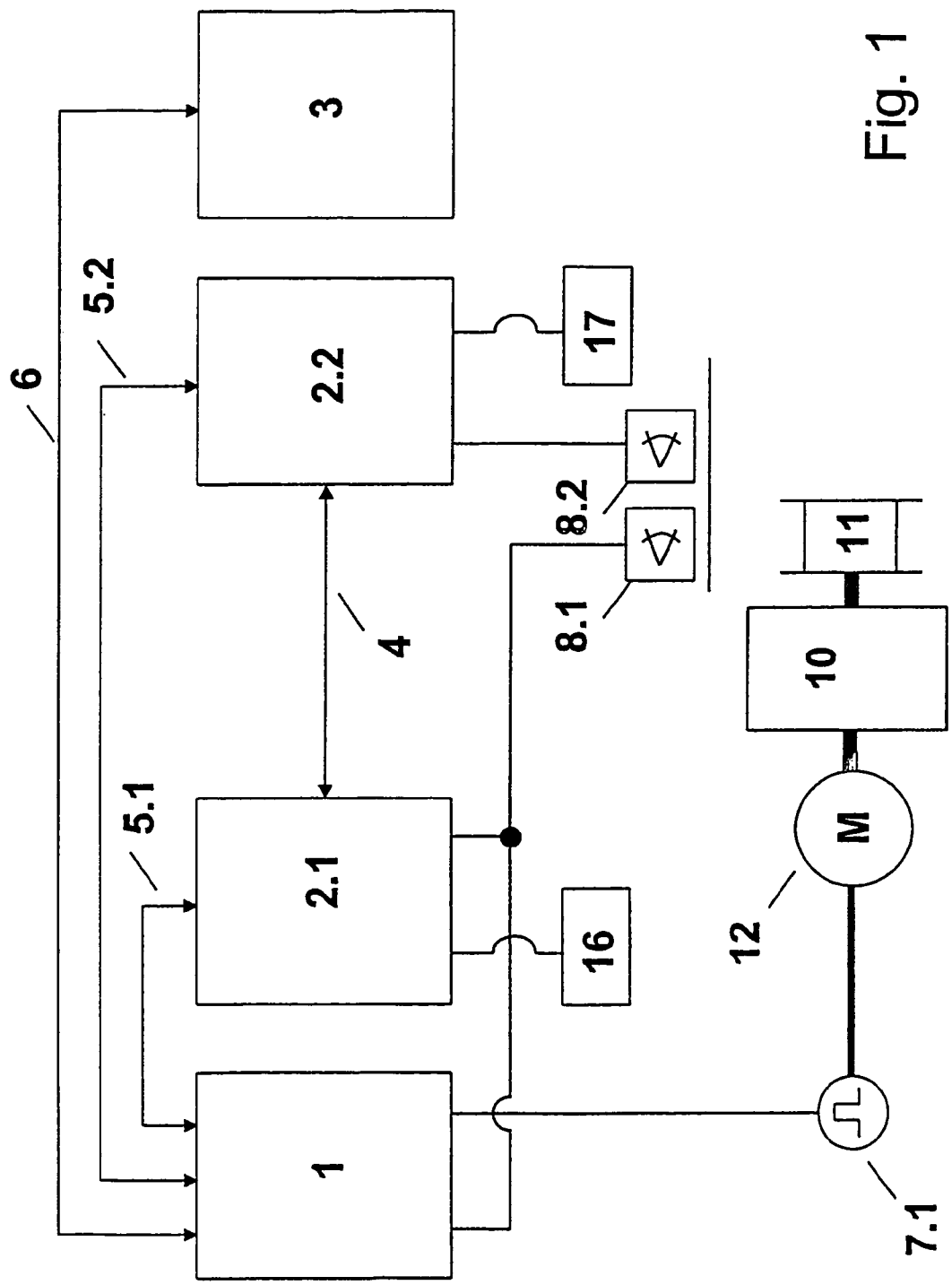
FIG. 1 is a schematic circuit arrangement of a safety circuit for an electric drive designed as the travel motor of a gantry crane.

FIG. 1 shows a schematic circuit arrangement of a safety circuit for an electric drive 12 designed as the travel motor of a gantry crane. This circuit arrangement, of course, can also be used for a trolley traveling drive. The link between the machine controls 3 and the power converter 1 for entering the travel commands is indicated by the line 6. The evaluation units for the position of the crane or that of its driven body in the form of a wheel assembly 11 are designated by 2.1 and 2.2. The evaluation units 2.1 and 2.2 are each self-standing computer units. Each of these units 2.1 and 2.2 consists of an electrical power pack, a CPU for the processing of logical commands, a storage to keep the program instructions, input and output modules for the processing of signals and measured quantities, as well as an internal communication bus, which connects the CPU, storage medium, and input/output modules. Both of the evaluation units 2.1 and 2.2 are identical in construction.

In order to fulfill the requirements in the present case for category 3, as set forth by the risk assessment per EN95471, in addition to an absolute value transmitter 8.1 that is present at the power take-off side, in parallel with the movement of the axle of the wheel assembly 11, there is installed a second absolute value transmitter 8.2, which detect the position of the crane. These absolute value transmitters 8.1, 8.2 can be designed, for example, as transponders arranged along the travel way and an antenna arranged in the region of the wheel assembly 11. Any other kind of noncontact position detection can also be used here. It is also possible to arrange a rack along the travel way, intermeshing with a gear that is secured in the region of the wheel assembly 11 and whose turning motions are detected by a sensor. The evaluation of this redundant sensor group likewise occurs with the two mutually monitoring evaluation units 2.1 and 2.2. These units 2.1 and 2.2 are designed to be redundant in function and hardware and, together with the redundant position detection system using the absolute value transmitters 8.1 and 8.2, they take the place of the conventional mechanical or electrically engineered end switches. The absolute value transmitter 8.1 and 8.2 furnishes continuous measurement values along a traveled stretch. These measurement values are proportional and constant and can be used to measure length or determine position. The evaluation units 2.1 and 2.2 at the same time poll the condition of the servo-elements for the power converter 1 of the safety circuits, so as to guarantee the safe functioning of the servo-elements.

This redundant layout of the position detection, evaluation and disconnection fulfills the requirement of category 3 per EN954.T1, i.e., the failure of one transmitter 8.1 or 8.2 is recognized, reported, and possibly terminates the movement of the axle of the wheel assembly 11, driven by the motor 12 via the transmission 10, by disconnecting the motor 12 with the safety disconnect elements 16, 17. Each individual fault in the transmitter circuits is recognized. Single-fault safety is likewise assured by the feedback 5.1 and 5.2 from the servo-elements for the power converter 1 to the two parts of the evaluation unit 2.1 and 2.2. The servo-element, or also a switching contactor, uses a control voltage to switch an activating coil, which opens or closes the actual power circuit. Depending on the design of a servo-element, one calls this a breaker or a maker. The power converter 1 actuates the electric motor and governs its running behavior. By conditioning the current and voltage, the power converter 1 provides the correct torques and numbers of revolutions for the electric motor at all times.

The evaluation units 2.1 and 2.2 constantly update their absolute position values by the two absolute value transmitters 8.1 and 8.2. The currently arriving position feedback values are compared to the position value for the end of the travel that is permanently stored in these evaluation units. As the values come closer (the position value for the end of the travel and the position feedback value furnished instantaneously by the transmitter), the evaluation units 2.1 and 2.2 decrease the switching points on their disconnect curves in proportion to this proximity. When the values are equal to each other, the evaluation units 2.1 and 2.2 switch the value to zero, independently of other switching levels or other logical conditions, so that this terminates the movement of the axle of the wheel assembly 11.

Both parts of the evaluation unit 2.1 and 2.2 work on the principle of mutual checking 4 of their own resulting logical decision and the logically positive condition, i.e., enabling of travel of the axle of the wheel assembly 11 is only maintained with mutual consent 4 of the evaluation units ("AND" operation). On the other hand, termination of the logically positive condition occurs by itself, i.e., without mutual consent of the evaluation units 2.1, 2.2. Thus, each individual part of the evaluation unit 2.1 or 2.2 can by itself compel a termination ("OR" operation). Finally, both evaluation units verify their "live" status and, in this way, their lines of communication 4.

Figure 2:
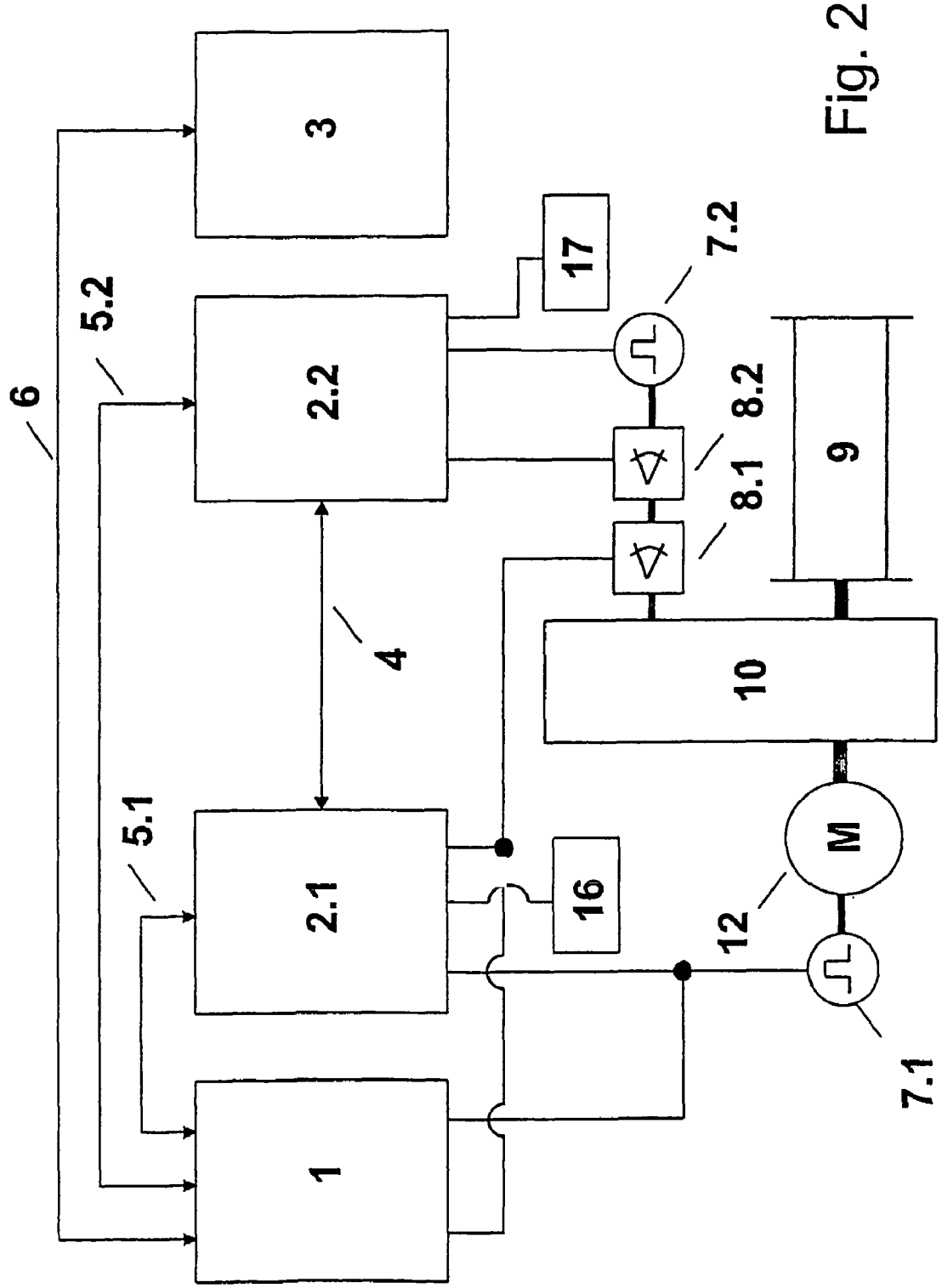
FIG. 2 is a schematic circuit arrangement of a safety circuit for an electric drive designed as the motor of a lifting mechanism.

FIG. 2 shows a schematic circuit arrangement of a safety disconnect for an electric drive 12 designed as a winch motor. A power converter, designated as 1, receives commands 6 from the machine controls 3 for the winch motor 12. The power converter 1 actuates the winch motor 12, which is designed as a frequency-controlled three-phase motor, and governs its running behavior. By conditioning the current and voltage, the power converter 1 provides the correct torques and numbers of revolutions for the winch motor 12 at all times. Through the power converter 1, a measurement of the load lifted or lowered by the winch motor 12 is also accomplished by means of a comparison of the power consumption. Since the current is measured in continual manner in the power converter 1 and this is proportional to the lifted load, one can normalize the current to a load weight and thus use this to determine the load weight. It would also be possible to arrange an additional sensor on the winch for the load measurement. Two evaluation units are designated as 2.1 and 2.2, which receive their feedback 5.1 and 5.2 from the servo-elements of the power converter 1. The evaluation units 2.1 and 2.2 are each self-standing computer units. Each of these evaluation units 2.1 and 2.2 consists of an electrical power pack, a CPU for the processing of logical commands, a storage to keep the program instructions, input and output modules for the processing of signals and measured quantities, as well as an internal communication bus, which connects the CPU, storage medium, and input/output modules. Both of the evaluation units 2.1 and 2.2 are identical in construction. Communication and comparisons between the evaluation units 2.1 and 2.2 are indicated by a communication line 4. Pulse transmitters of the winch are designated as 7.1, 7.2, and 7.3. The pulse transmitters 7.1 and 7.2 are configured as pulsed shaft encoders or as incremental transmitters, which provide continuously rising or falling measured values of the rotation of the winch axle, i.e., the shaft of the winch motor or the power take-off shaft of the transmission 10 or the shaft of the cable drum 9. These measured values are proportional and constant and they are used to determine the number of revolutions. With additional reference points, the pulse transmitters 7.1 and 7.2 could also be used to measure distances. The measured values of the pulse transmitters 7.1 and 7.2 are volatile, i.e., the detection or counting starts anew when the power returns, but without knowing the old value that existed before the power disconnection. Redundant absolute value transmitters are designated by 8.1 and 8.2, serving to monitor the position of the winch axle. The absolute value transmitters 8.1 and 8.2 each furnish continuous measured values along a winding stretch. These measured values are proportional and constant and they can be used to measure length. The winch has a cable drum 9, which is driven via a transmission assembly 10 from the winch motor 12. The absolute value transmitters 8.1 and 8.2 are subordinate to the transmission assembly 10 in this case.

As depicted, a third pulse transmitter 7.3 is mounted at the power take-off side of the winch axle on the transmission assembly 10, in addition to the pulse transmitter 7.2 provided at the drive side.

Together with the two absolute value transmitters 8.1, 8.2 for the position monitoring on the winch axle of the transmission assembly 10, the redundant pulse transmitter assembly 7.1 and 7.2 is likewise processed by the evaluation units 2.1, 2.2. What occurs here is a determination of the number of revolutions at the winch axle, which in traditional safety systems of the prior art was detected by the conventional centrifugal transmitter. The number of revolutions, calculated redundantly in continuous manner by using the increments of the two pulse transmitters 7.1, 7.2, is compared to each other and to the overspeeding value stored in the evaluation units 2.1, 2.2 at 4. The overspeeding is stored in the evaluation units 2.1, 2.2 as a function of the load being lifted by the winch. The load present on the winch is determined as described above through a current measurement by the power converter 1 or corresponding sensors, so that each time the overspeeding previously stored for the current load can be called up in the evaluation unit 2.1, 2.2. Upon reaching the critical overspeeding, the evaluation units 2.1, 2.2 disconnect the servo-element for the power converter 1 of the winch by means of the safety disconnect elements 16, 17 and terminate the movement of the axle of the cable drum 9. The safety disconnect elements 16, 17 are designed as contactors.

Thanks to the redundant detection of the number of revolutions and by making use of the load feedback value in the evaluation unit 2.1, 2.2, the invention makes it possible to recognize the reaching of an overspeeding at an earlier, or proper time, when lifting at a speed which is a function of the load, and to disconnect the motion of the winch axle of the winch drum 9 at any given load-dependent speed.

This redundant incremental pulse transmitter 7.1, 7.2 and absolute value transmitter layout 8.1, 8.2 for a winch with cable drum 9, transmission assembly 10 and winch motor 12 fulfills the requirement of category 3 per the European permit EN954.T1 for winches. The failure of a transmitter 7.1, 7.2, 8.1, 8.2 results in recognition of the faulty condition; this is reported at once and leads to the disconnecting of the winch axle by the safety disconnect elements. Each individual fault in the transmitter circuits 7.1, 7.2, 8.1, 8.2 will be processed. Single-fault safety is constantly assured thanks to the feedback 5.1, 5.2 from the servo-elements of the power converter I to the two parts of the evaluation unit 2.1, 2.2.

FIG. 3 shows the safety circuit of FIG. 2 in an alternative embodiment. Basically, therefore, one can refer to the description for FIG. 2. Only the differences shall be described hereafter. The evaluation units 2.1, 2.2 here are assembled into a single failsafe evaluation unit 2. 1, which takes over all the functions of the evaluation units 2.1, 2.2 and the communication line 4. Furthermore, the sensors 7.1, 7.2, 8.1, 8.2 are not connected directly to the evaluation units 2.1, 2.2, but instead each one to a transmitting unit 13.1, 13.2. Each of the transmitting units 13.1, 13.2 is connected via a single transmission stretch 15.1, 15.2 to a receiving unit 14.1, 14.2, which in turn are connected to the corresponding evaluation unit 2.1. In this embodiment of the evaluation unit 2.1, a single safety disconnect element 16 is sufficient.

LIST OF REFERENCE NUMBERS 1 power converter
2.1 evaluation unit
2.2 evaluation unit
3 machine controls
4 communication line
5.1 feedback of evaluation unit 2.1
5.2 feedback of evaluation unit 2.2
6 control commands
7.1 pulse transmitter
7.2 pulse transmitter
8.1 absolute value transmitter
8.2 absolute value transmitter
9 cable drum
10 transmission assembly
11 wheel assembly
12 electric drive
13.1 transmitting unit
13.2 transmitting unit
14.1 receiving unit
14.2 receiving unit
15.1 transmission stretch
15.2 transmission stretch
16 safety disconnect element
17 safety disconnect element

The invention claimed is:

1. Method for the safe disconnection of an electric drive configured as a frequency-controlled three-phase crane motor, in which signals from redundant sensors, which detect the movements produced by the electric drive, are compared in an evaluation unit to a preselected limit value and the evaluation unit is used to provide the function of an end switch element and bring about a safe disconnection in the event of exceeding of the preselected limit value of the electric drive, said method comprising:

redundantly detecting and redundantly comparing the signals of the sensors in evaluation units to preselected limit values, so that a redundant safe disconnection of the electric drive is achieved without the use of mechanical end switches in the event of an exceeding of the preselected limit value; and evaluating the signals of the redundant sensors at corresponding redundant evaluation units to determine if the respective signals of the redundant sensors deviate from each other, and if the respective signals of the sensors deviate from each other then disconnecting the motor by redundant safe disconnection elements;

wherein the redundant evaluation units mutually monitor each other, and the motor is safely disconnected by redundant safe disconnection elements if the disconnect signals of the evaluation units deviate from each other.

2. Method per claim 1, wherein the redundant sensors detect the revolutions of a body moved by the electric drive and additional redundant sensors detect the position of the body moved by the electric drive.

3. Device for the safe disconnection of an electric drive configured as a frequency-controlled three-phase crane motor with redundant sensors, wherein said sensors detect the movements produced by the electric drive, with an evaluation unit processing the signals of the sensors for comparing the signals of the sensors to a preselected limit value and for safe disconnecting of the electric drive to provide the function of an end switch element in the event of exceeding of the preselected limit value, said device comprising:

redundant sensors and redundant evaluation units, each of the redundant sensors being coordinated with one of the evaluation units, signals of the redundant sensors being compared in the evaluation units to preselected limit values, and a redundant safe disconnection of the electric drive is achieved by the evaluation units without the use of mechanical end switches in the event of an exceeding of the preselected limit value; and a communication line connected to each of the redundant evaluation units for mutual monitoring, in the respective redundant evaluation units, of the signals of the respective redundant sensors, wherein the signals are compared to each other to determine if they deviate from each other and, in event of a deviation of the respective signals of the sensors from each other, the evaluation units safely disconnect the motor by way of redundant safety disconnect elements, and the redundant evaluation units are connected to each other by the communication line for mutual monitoring and, when their disconnect signals differ from each other, they safely disconnect the motor by the redundant safety disconnect elements.

4. Device per claim 3 including first redundant sensors for detection of the revolutions of the body moved by the electric drive that are assigned to the body and second redundant sensors for detection of the position of the body moved by the electric drive that are assigned to the body.

5. Device per claim 4, including at least two absolute value transmitters that are assigned to the electric drive at a power take-off side of the electric drive, said absolute value transmitters adapted to transmit redundant position.

6. Device per claim 5, wherein the two evaluation units constantly update the absolute position values of the two absolute value transmitters and compare present position feedback values to position setpoint values of a travel way or winding/unwinding path of a cable that are permanently stored in the evaluation units.

7. Device per claim 6, wherein as the position values furnished instantaneously by the absolute value transmitters approach the position value defining the end of the travel way or winding/unwinding path, the evaluation units adjust a driving speed of the electric drive to effect a soft braking.

8. Device per claim 7 including one pulse transmitter assigned to the body moved by the electric drive at the drive side and at least one pulse transmitter at the power take-off side, wherein in each of the evaluation units the revolutions of the axle of the body are redundantly calculated in an ongoing manner in terms of the increments of the pulse transmitters at the drive side and the power take-off side and compared to an overspeeding value stored in the evaluation units for safe disconnection of the electric drive.

9. Device per claim 8, wherein the body is a cable drum and the overspeeding values are stored in the evaluation units as a function of the load being lifted.

10. Device per claim 9, wherein the evaluation units are designed to be redundant in function and in hardware.

11. Device per claim 10, wherein the evaluation units are assembled in a single failsafe evaluation unit.

12. Device per claim 11, wherein the sensors are each connected to a transmitter unit, each of the transmitter units is connected by its own transmission path to a receiving unit, which in turn is connected to the corresponding evaluation unit.

13. Device per claim 3, including at least two absolute value transmitters that are assigned to the electric drive at a power take-off side of the electric drive, said absolute value transmitters for a redundant position detection.

14. Device per claim 13, wherein the two evaluation units constantly update the absolute position values of the two absolute value transmitters and compare present position feedback values to position setpoint values of a travel way or winding/unwinding path of a cable that are permanently stored in the evaluation units.

15. Device per claim 5, wherein as the position values furnished instantaneously by the absolute value transmitters approach the position value defining the end of the travel way or winding/unwinding path, the evaluation units adjust a driving speed of the electric drive to effect a soft braking.

16. Device per claim 3 including one pulse transmitter assigned to the body moved by the electric drive at the drive side and at least one pulse transmitter at the power take-off side, wherein in each of the evaluation units the revolutions of the axle of the body are redundantly calculated in an ongoing manner in terms of the increments of the pulse transmitters at the drive side and the power take-off side and compared to an overspeeding value stored in the evaluation units for safe disconnection of the electric drive.

17. Device per claim 16, wherein the body is a cable drum and the overspeeding values are stored in the evaluation units as a function of the load being lifted.

18. Device per claim 3, wherein the evaluation units are designed to be redundant in function and in hardware.

19. Device per claim 3, wherein the evaluation units are assembled in a single failsafe evaluation unit.

20. Device per claim 3, wherein the sensors are each connected to a transmitter unit, each of the transmitter units is connected by its own transmission path to a receiving unit, which in turn is connected to the corresponding evaluation unit.

21. A device for the safe disconnection of an electric drive configured as a frequency-controlled three-phase crane motor with redundant sensors, wherein said sensors detect the movements produced by the electric drive, with an evaluation unit processing the signals of the sensors for comparing the signals of the sensors to a preselected limit value and for safe disconnecting of the electric drive to provide the function of an end switch element in the event of exceeding of the preselected limit value, said device comprising:

redundant sensors and redundant evaluation units, each of the redundant sensors being coordinated with one of the evaluation units, signals of the redundant sensors being compared in the evaluation units to preselected limit values whereby a redundant safe disconnection of the electric drive is achieved by the evaluation units without the use of mechanical end switches in the event of an exceeding of the preselected limit value;

a communication line connecting the redundant evaluation units to each other for mutual monitoring, in the respective redundant evaluation units, of the signals of the respective redundant sensors, wherein the signals are compared to each other to determine if they deviate from each other and, in event of a deviation of the respective signals of the sensors from each other, the evaluation units safely disconnect the motor from a revolving body having an axle by way of redundant safety disconnect elements, and the redundant evaluation units are connected to each other by the communication line for mutual monitoring and, when their disconnect signals differ from each other, they safely disconnect the motor from the revolving body having an axle by way of the redundant safety disconnect elements;

a first pulse transmitter assigned to the revolving body having an axle that is moved by the electric drive and that is positioned at the drive side;

a second pulse transmitter positioned at the power take-off side of the electric drive; and wherein each of the evaluation units redundantly calculate the revolutions of the axle of the body in an ongoing manner in terms of the increments of the pulse transmitters at the drive side and the power take-off side and compare said revolutions to an overspeeding value stored in the evaluation units for safe disconnection of the electric drive.

22. The device of claim 21 wherein the body is a cable drum and the overspeeding values are stored in the evaluation units as a function of the load being lifted.

23. The device of claim 21 wherein the evaluation units are designed to be redundant in function and in hardware.

24. The device of claim 21 wherein the evaluation units are assembled in a single failsafe evaluation unit.

25. The device of claim 21 wherein the sensors are each connected to a transmitter unit, each of the transmitter units is connected by its own transmission path to a receiving unit, which in turn is connected to the corresponding evaluation unit.

* * * * *

UNITED STATES PATENT AND TRADEMARK OFFICE
CERTIFICATE OF CORRECTION

| | | |
|---|---|---|
| PATENT NO. | : 7,515,389 B2 | Page 1 of 1 |
| APPLICATION NO. | : 10/545860 | |
| DATED | : April 7, 2009 | |
| INVENTOR(S) | : Ronald Kleine et al. | |

It is certified that error appears in the above-identified patent and that said Letters Patent is hereby corrected as shown below:

<u>Column 5</u>
Line 20, delete "FIG. 3, a safety circuit per FIG. 2 in an alternative embodiment."

<u>Column 8</u>
Lines 11 and 12, "converter I" should be --converter 1--

Signed and Sealed this

Twenty-sixth Day of May, 2009

JOHN DOLL
*Acting Director of the United States Patent and Trademark Office*